(12) United States Patent
Son

(10) Patent No.: US 7,195,405 B2
(45) Date of Patent: Mar. 27, 2007

(54) NUMBER PLATE COMBINATION TYPE CAMERA APPARATUS FOR REAR MONITORING OF VEHICLE

(76) Inventor: Kyong-Sik Son, Sinjeong-Dong 312 Mokdongsinsigaji Apt 928-105, Yang Chon-Gu, Seoul (KR)

( * ) Notice: Subject to any disclaimer, the term of this patent is extended or adjusted under 35 U.S.C. 154(b) by 0 days.

(21) Appl. No.: 11/322,045

(22) Filed: Dec. 29, 2005

(65) Prior Publication Data

US 2006/0257136 A1 Nov. 16, 2006

(51) Int. Cl.
*G03B 17/48* (2006.01)
*G09F 7/00* (2006.01)
*H04N 7/18* (2006.01)

(52) U.S. Cl. .................. 396/427; 396/429; 348/148; 40/209

(58) Field of Classification Search ............... 396/419, 396/427, 428; 348/118–120, 148, 373–376; 40/209
See application file for complete search history.

(56) References Cited

U.S. PATENT DOCUMENTS

| | | | |
|---|---|---|---|
| 6,025,784 A * | 2/2000 | Mish ....................... | 340/693.5 |
| 6,433,680 B1 * | 8/2002 | Ho ............................. | 340/435 |
| 6,721,501 B2 * | 4/2004 | Komatsu ..................... | 396/429 |
| 2005/0005484 A1 * | 1/2005 | Simonazzi ................... | 40/200 |
| 2005/0093684 A1 * | 5/2005 | Cunnien ..................... | 340/435 |
| 2005/0198876 A1 * | 9/2005 | Chang et al. ................. | 40/209 |

* cited by examiner

*Primary Examiner*—W. B. Perkey
(74) *Attorney, Agent, or Firm*—John K. Park; Park Law Firm

(57) ABSTRACT

A number plate combination type camera apparatus for rear monitoring of a vehicle includes a revolvable case, a camera, a number plate holder. The revolvable case has an opening and a plurality of mounting axles. The camera having a lens is provided in the revolvable case, and the lens is exposed through the opening of the revolvable case. The number plate holder has a rim with front and rear plates, a first opening for exposing part of the number plate, a second opening for exposing the lens of the camera, a case-mounting portion for mounting the revolvable case, a case-axle receptacle for fixing the mounting axle of the revolvable case, and a plurality of fixing devices. The case-mounting portion is formed integrally with the plate holder, and the case-axle receptacle is provided on the rear plate of the rim of the plate holder toward the direction of the vehicle.

15 Claims, 4 Drawing Sheets

NUMBER PLATE COMBINATION TYPE CAMERA APPARATUS FOR REAR MONITORING OF VEHICLE

BACKGROUND OF THE INVENTION

The present invention relates to a number plate combination type camera apparatus for rear monitoring of vehicle.

More particularly, this invention relates to a number plate combination type camera apparatus for rear monitoring of vehicle, which is installed on the rear side of the number plate holder.

Still more particularly, the present invention relates to a number plate combination type camera apparatus for rear monitoring of vehicle, which is hard to take away from the front side of the number plate holder, discouraging stealing.

In general, the rear monitoring of a vehicle is provided by a couple of side-mirrors and rearview mirrors installed inside and outside of the vehicle. But, due to the blind points the view is limited. To solve the problem, the prior art uses a supersonic wave to detect the presence of obstacles behind the vehicle, which is still limited because it detects the presence or absence only of the obstacles but cannot determine the exact situation.

To overcome the limitation of the supersonic detector, a video camera was installed at the rear side of the vehicle and a monitor is installed inside the vehicle to display the images taken by the camera.

FIG. 1 shows such a camera installed on a number plate.

The surveillance camera is attached to a part of the rim of number plate 4, in an accepting groove 1a, which includes a support 1b with a hole 1b-1. The support 1b is formed integrally with the number plate holder 1. The plate holder 1 has a cylindrical member 2a rotatably inside the accepting groove 1a. A rotational body 2 is installed on the hole 1b-1 of the accepting groove 1a. The lens 3 is installed on the side surface of the rotational body and controllably tilted by the rotation of the rotational body 2.

The rear-view surveillance camera of the prior art of FIG. 1 is fixed on the rim of the plate holder 1. And, the rotational body 2 with the cylindrical member 2a tilting up and down along the rotational axis 2b in the accepting groove 1a is installed on the plate holder 1, by which the angle of the camera 3 is controlled.

In such a traditional rear-view surveillance camera, however, the rotational body 2 along with the camera 3 can be detached easily from the outside since the rotational body 2 is fixed through the hole 1b-1 of the support 1b. Therefore, it can be easily subject to a vandalism or stealing.

Accordingly, a need for a number plate combination type camera apparatus has been present for a long time. This invention is directed to solve these problems and satisfy the long-felt need.

SUMMARY OF THE INVENTION

The present invention contrives to solve the disadvantages of the prior art.

An objective of the invention is to provide a number plate combination type camera apparatus.

Another object of the invention is to provide a number plate combination type camera apparatus, in which the revolvable case having the camera is installed behind the number plate holder.

Still another object of the invention is to provide a number plate combination type camera apparatus that prevents vandalism or theft.

For the objectives, a number plate combination type camera apparatus is provided, which includes a number plate holder, a revolvable case, and a camera lens. The number plate holder is attached around the number plate of the vehicle, and includes an accepting receptacle for the revolvable case. The revolvable case is installed revolvably through the mounting axle to the accepting receptacle. The camera lens is installed at the center of the revolvable case and its tilting is controlled by the rotation of the revolvable case.

The camera apparatus may further include a fixing frame for supporting the revolvable case against the number plate holder.

In an embodiment, a number plate combination type camera apparatus for rear monitoring of a vehicle includes a revolvable case, a camera, a number plate holder.

The revolvable case has an opening and a plurality of mounting axles.

The camera having a lens is provided in the revolvable case, and the lens is exposed through the opening of the revolvable case.

The number plate holder has a rim with front and rear plates, a first opening for exposing part of the number plate, a second opening for exposing the lens of the camera, a case-mounting portion for mounting the revolvable case, a case-axle receptacle for fixing the mounting axle of the revolvable case, and a plurality of fixing devices.

The viewing angle of the lens of the camera is controllable by the rotation of the revolvable case in the second opening of the number plate holder. The case-mounting portion is formed integrally with the number plate holder, and the case-axle receptacle is provided on the rear plate of the rim of the number plate holder toward the direction of the vehicle.

The revolvable case is substantially cylindrical, and the opening of the revolvable case opens on the side surface of the cylindrical revolvable case. The mounting axles are aligned along the axis of the cylindrical revolvable case.

The case-mounting portion is adapted to accept the revolvable case from the rear direction and to keeping the revolvable case and the camera from falling through the second opening toward the front direction. The case-mounting portion contacts with the revolvable case with a controllable friction.

The plurality of fixing devices of the number plate holder comprise a plurality of holes provided along the rim and a plurality of mechanical fastening devices. The mechanical fastening device includes a screw and a bolt.

The second opening and the case-mounting portion are provided on the top part of the rim of the number plate holder.

The number plate holder is substantially rectangular.

The number plate combination type camera apparatus further includes a fixing frame for holding the revolvable case from the rear direction, and the fixing frame is adapted to hold the revolvable case in between with the case-mounting portion of the number plate holder.

The fixing frame contacts with the revolvable case with a controllable friction. The fixing frame further includes a mounting device. The mounting device of the fixing frame includes a plurality of holes provided on the fixing frame and a plurality of mechanical fasteners. The mechanical fastening device includes a screw and a bolt.

The advantages of the present invention are: (1) the number plate combination type camera apparatus is tough against tampering from outside; and (2) the number plate combination type camera apparatus is robust against theft or vandalisim.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION OF THE INVENTION

Figure 1:
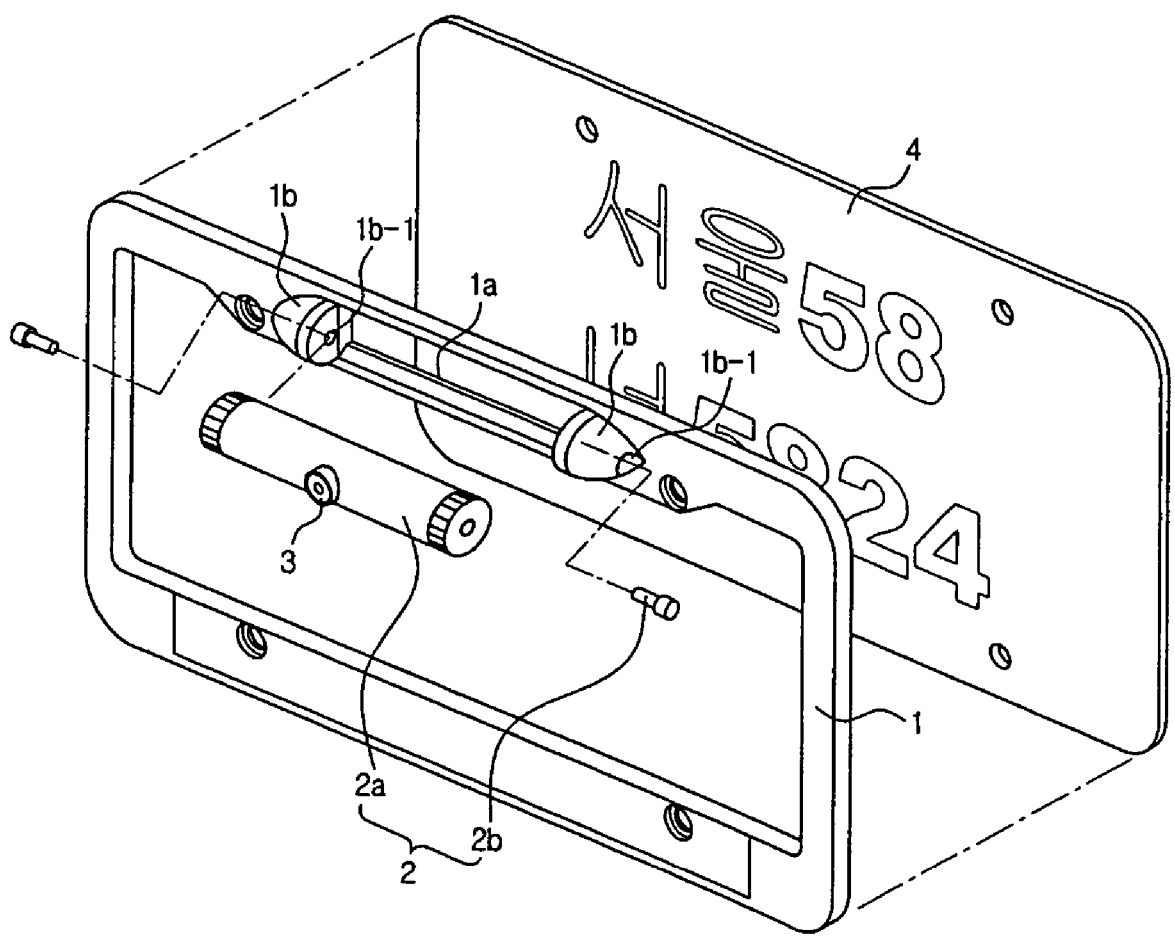
FIG. 1 is a rear-view surveillance camera according to the prior art.
Figure 2:
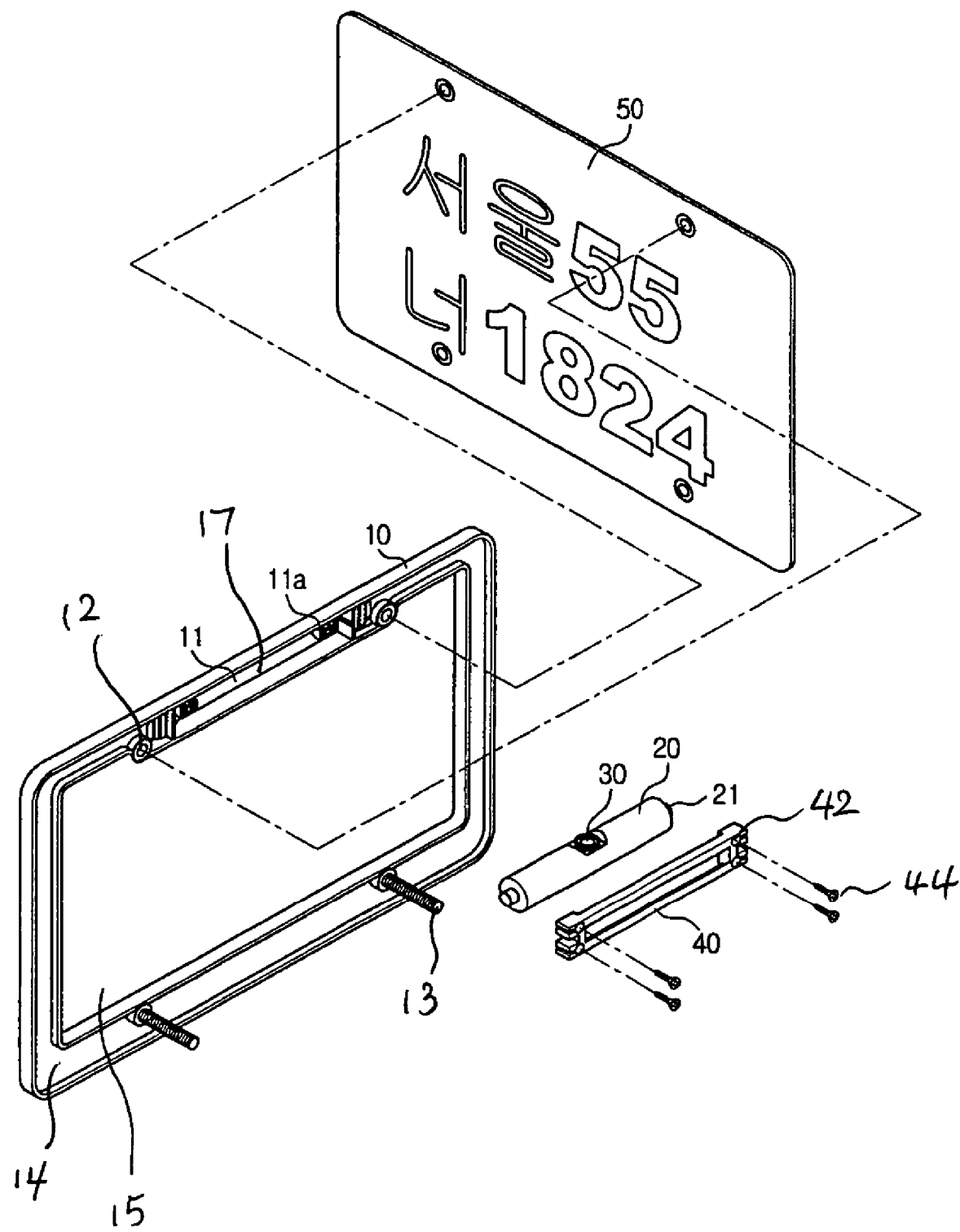
FIG. 2 is a perspective blow-up view of a number plate combination type camera apparatus according to the present invention.
Figure 3:
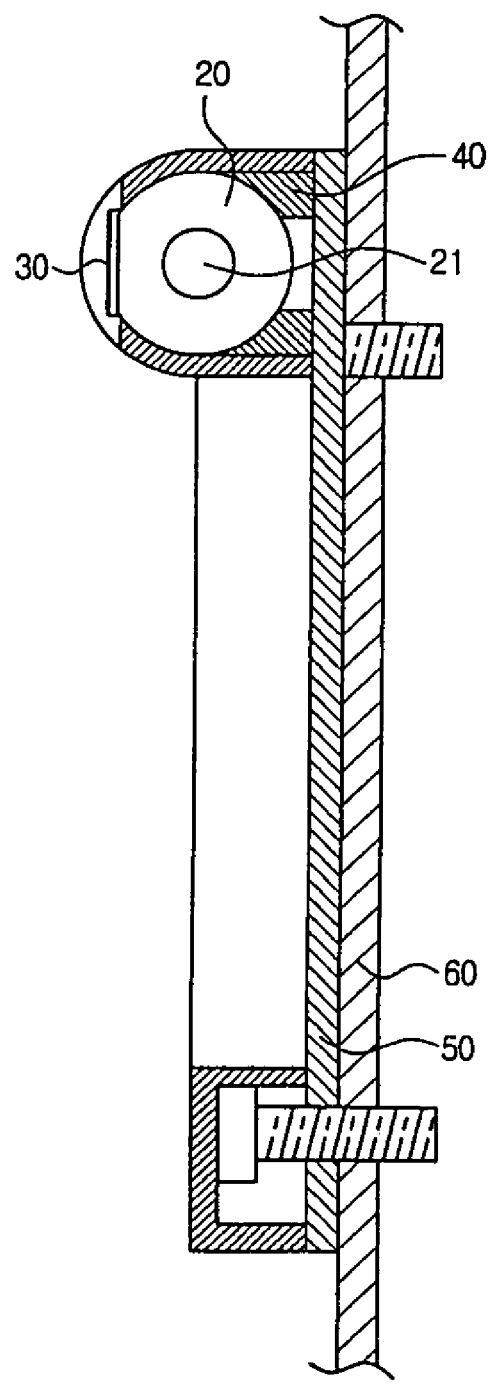
FIG. 3 is a vertical cross-section diagram of the assembled number plate combination type camera apparatus of FIG. 2.
Figure 4:
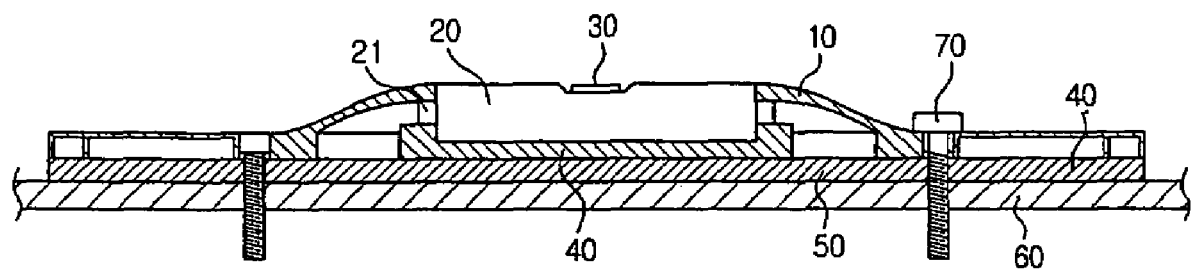
FIG. 4 is a horizontal cross-section diagram of the assembled number plate combination type camera apparatus of FIG. 2.

FIGS. 2 through 4 show a number plate combination type camera apparatus according to the present invention.

As shown in FIG. 2, the number plate combination type camera apparatus is attached around the number plate 50 of the vehicle 60.

The number plate combination type camera apparatus for rear monitoring of the vehicle 60 includes a revolvable case 20, a camera 30, a number plate holder 10.

The revolvable case 20 has an opening and a plurality of mounting axles 21.

The camera 30 having a lens is provided in the revolvable case 20, and the lens is exposed through the opening of the revolvable case 20.

The number plate holder 10 has a rim 14 with front and rear plates, a first opening 15 for exposing part of the number plate 50, a second opening 17 for exposing the lens of the camera 30, a case-mounting portion 11 for mounting the revolvable case 20, a case-axle receptacle 11a for fixing the mounting axle 21 of the revolvable case 20, and a plurality of fixing devices.

The viewing angle of the lens of the camera 30 is controllable by the rotation of the revolvable case 20 in the second opening 17 of the number plate holder 10. The case-mounting portion 11 is formed integrally with the number plate holder 10, and the case-axle receptacle 11a is provided on the rear plate of the rim 14 of the number plate holder 10 toward the direction of the vehicle 60.

The revolvable case 20 is substantially cylindrical, and the opening of the revolvable case 20 opens on the side surface of the cylindrical revolvable case 20. The mounting axles 21 are aligned along the axis of the cylindrical revolvable case 20.

The case-mounting portion 11 is adapted to accept the revolvable case 20 from the rear direction and to keeping the revolvable case 20 and the camera 30 from falling through the second opening 17 toward the front direction. The case-mounting portion 11 contacts with the revolvable case 20 with a controllable friction.

The plurality of fixing devices of the number plate holder 10 include a plurality of holes 12 provided along the rim 14 and a plurality of mechanical fastening devices 13. The mechanical fastening device 13 includes a screw and a bolt. The mechanical fastening device 13 may include a lead seal 70.

The second opening 17 and the case-mounting portion 11 are provided on the top part of the rim 14 of the number plate holder 10.

The number plate holder 10 is substantially rectangular.

The number plate combination type camera apparatus further includes a fixing frame 40 for holding the revolvable case 20 from the rear direction, and the fixing frame 40 is adapted to hold the revolvable case 20 in between with the case-mounting portion 11 of the number plate holder 10.

The fixing frame 40 contacts with the revolvable case 20 with a controllable friction. The fixing frame 40 further includes a mounting device. The mounting device of the fixing frame 40 includes a plurality of holes 42 provided on the fixing frame and a plurality of mechanical fasteners 44. The mechanical fastening device 44 includes a screw and a bolt.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A number plate combination type camera apparatus for rear monitoring of a vehicle comprising:
   a) a revolvable case having an opening and a plurality of mounting axles;
   b) a camera having a lens, wherein the camera is provided in the revolvable case, wherein the lens is exposed through the opening of the revolvable case; and
   c) a number plate holder having a rim with front and rear plates, a first opening for exposing part of the number plate, a second opening for exposing the lens of the camera, a case-mounting portion for mounting the revolvable case, a case-axle receptacle for fixing the mounting axle of the revolvable case, and a plurality of fixing devices,
   wherein the viewing angle of the lens of the camera is controllable by the rotation of the revolvable case in the second opening of the number plate holder, wherein the case-mounting portion is formed integrally with the number plate holder, wherein the case-axle receptacle is provided on the rear plate of the rim of the number plate holder toward the direction of the vehicle.

2. The number plate combination type camera apparatus of claim 1, wherein the revolvable case is substantially cylindrical.

3. The number plate combination type camera apparatus of claim 2, wherein the opening of the revolvable case opens on the side surface of the cylindrical revolvable case.

4. The number plate combination type camera apparatus of claim 2, wherein the mounting axles are aligned along the axis of the cylindrical revolvable case.

5. The number plate combination type camera apparatus of claim 1, wherein the case-mounting portion is adapted to accept the revolvable case from the rear direction and to keeping the revolvable case and the camera from falling through the second opening toward the front direction.

6. The number plate combination type camera apparatus of claim 5, wherein the case-mounting portion contacts with the revolvable case with a controllable friction.

7. The number plate combination type camera apparatus of claim 1, wherein the plurality of fixing devices of the number plate holder comprise a plurality of holes provided along the rim and a plurality of mechanical fastening devices.

8. The number plate combination type camera apparatus of claim 7, wherein the mechanical fastening device comprises a screw and a bolt.

9. The number plate combination type camera apparatus of claim 1, wherein the second opening and the case-mounting portion are provided on the top part of the rim of the number plate holder.

10. The number plate combination type camera apparatus of claim 1, wherein the number plate holder is substantially rectangular.

11. The number plate combination type camera apparatus of claim 1, further comprising a fixing frame for holding the revolvable case from the rear direction, wherein the fixing frame is adapted to hold the revolvable case in between with the case-mounting portion of the number plate holder.

12. The number plate combination type camera apparatus of claim 11, wherein the fixing frame contacts with the revolvable case with a controllable friction.

13. The number plate combination type camera apparatus of claim 11, wherein the fixing frame further comprises a mounting device.

14. The number plate combination type camera apparatus of claim 13, wherein the mounting device of the fixing frame comprises a plurality of holes provided on the fixing frame and a plurality of mechanical fasteners.

15. The number plate combination type camera apparatus of claim 13, wherein the mechanical fastening device comprises a screw and a bolt.

* * * * *